United States Patent [19]

Bassler

[11] 4,071,730

[45] Jan. 31, 1978

[54] METHOD TO SECURE ARMATURE CONDUCTORS TO THE COMMUTATOR STRIPS IN DYNAMO ELECTRIC MACHINES

[75] Inventor: Gerd Bassler, Kornwestheim, Germany

[73] Assignee: Robert Bosch GmbH, Stuttgart, Germany

[21] Appl. No.: 669,837

[22] Filed: Mar. 24, 1976

[30] Foreign Application Priority Data

Apr. 29, 1975 Germany ............................ 2518973

[51] Int. Cl.$^2$ ................................................ B23K 1/12

[52] U.S. Cl. ................................ 219/85 CM; 29/597; 219/118; 228/190; 310/207

[58] Field of Search ............... 29/596, 597; 219/85 R, 219/85 A, 85 BA, 85 BM, 85 CA, 85 CM, 85 F, 85 M, 129, 118; 228/179, 190, 245; 310/207

[56] References Cited

U.S. PATENT DOCUMENTS

| | | | |
|---|---|---|---|
| 2,782,330 | 2/1957 | Baclawski | 219/85 CA |
| 2,878,405 | 3/1959 | Merril | 29/597 X |
| 3,919,576 | 11/1975 | Reinbeck et al. | 310/207 |

FOREIGN PATENT DOCUMENTS

| | | | |
|---|---|---|---|
| 837,003 | 6/1960 | United Kingdom | 219/85 A |

*Primary Examiner*—J. V. Truhe
*Assistant Examiner*—N. D. Herkamp
*Attorney, Agent, or Firm*—Flynn & Frishauf

[57] ABSTRACT

A plurality of conductors forming the armature windings are arranged in a superimposed stack, with their end faces aligned and located over the respective commutator strip or lamella. An electrode presses the stack against the lamella, another electrode, preferably liquid cooled, is applied to the lamella and solder, for example in form of a ribbon, placed against the end faces of the conductors forming the stack. Upon application of current, the solder will melt and flow between the commutator lamella and the conductor strips forming the armature winding to simultaneously, in one step, secure together the conductors and the commutator lamella. The method is particularly applicable to forming the armature windings in d-c motors for example in electric-car driving motors.

10 Claims, 1 Drawing Figure

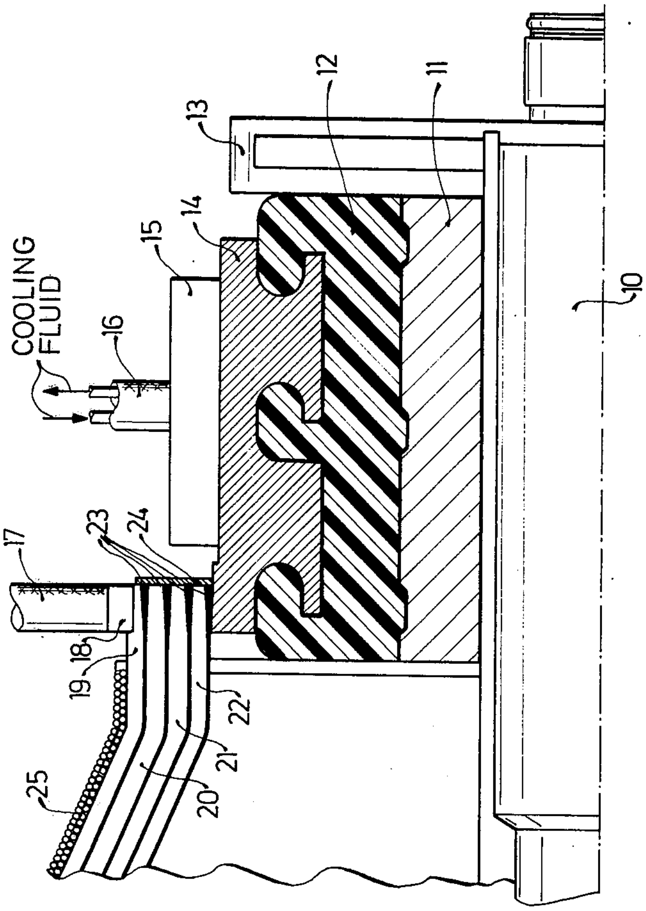
COOLING FLUID
10
11
12
13
14
15
16
17
18
19
20
21
22
23
24
25

METHOD TO SECURE ARMATURE CONDUCTORS TO THE COMMUTATOR STRIPS IN DYNAMO ELECTRIC MACHINES

CROSS REFERENCE TO RELATED PATENT

U.S. Pat. No. 3,919,576, Reinbeck et al, assigned to the assignee of the present invention.

The present invention relates to a method to secure a plurality of armature conductors to a commutator lamella of the commutator of a d-c dynamo electric machine, more particularly a d-c motor.

It has previously been proposed — see U.S. Pat. No. 3,919,576 — to secure the plurality of armature bars forming armature conductors of a coil of the armature winding of a d-c motor to a collector by welding, brazing, hard-soldering, or the like. This was done in two different steps. First, the various armature conductors are welded together; thereafter, the collector lamella and that one of the armature conductors which extends beyond the remaining armature conductors previously welded together were connected by hard-soldering or brazing. This method is comparatively expensive to apply and quite time-consuming since two separate manufacturing steps have to be carried out sequentially. Forming the electrical and mechanical connection of a plurality of armature conductors on a single collector lamella has, however, resulted in substantial difficulties, so that the two-step process had to be used, in spite of its disadvantages.

It is an object of the present invention to simplify connection of armature conductor strips to a collector lamella, which provides a reliable electrical and mechanical connection and which is simple, efficient and fast. The method must, additionally, result in high mechanical strength of the connection while providing good electrical conductivity between the conductors themselves and between the conductors and the respective commutator lamella or commutator strip, resulting in a bond which is reliable in operation, while still being inexpensive in application.

SUBJECT MATTER OF THE PRESENT INVENTION

Briefly, associated armature conductor bars or strips are connected together and to the respective commutator strip or lamella in a single operating step using resistance soldering. This method substantially reduces the manufacturing requirements and results in a connection which is, at the same time, electrically reliable with low contact resistance as well as mechanically sturdy. The various armature conductor strips as well as the commutator strips are reliably and effectively connected together and among each other, both electrically as well as mechanically. In one operating step, therefore, all the connections are made simultaneously. The operating step comprises resistance hard-soldering; thus, a separate manufacturing step of interconnecting the armature conductor strips can be eliminated. Only a single jig is necessary when carrying out the method, which can be combined or formed on the operating head of a resistance welding machine. Electrical conductivity of the resulting bond is actually improved over that previously used since the distribution of solder will extend over substantially great connecting surfaces, when compared with the contact area obtained upon resistance spot-welding or resistance compression welding.

The invention will be described by way of example with reference to the accompanying drawing, wherein the single figure is a schematic cross-sectional view through half of the shaft end of a d-c motor illustrating the ends of the armature conductors and a commutator strip to which the conductors are attached.

Shaft 10 of a d-c motor has a bushing 11 applied thereto on which the commutator itself is secured. Only one of the collector strips or lamellae 14 is visible in the drawing. An insulating sleeve or bushing 12 is located between the bushing 11 and the commutator strips 14. The insulation between the commutator strips themselves is not visible in the drawing, and the commutator elements or lamellae, the insulation separators and the like can all be standard. An end holder 13 is provided in order to axially locate the commutator. The various components of the commutator can be press-fitted on shaft 10.

A coil of the armature winding is formed by four conductor strips having end portions 19, 20, 21, 22. The end portion of this coil is to be connected to a respective collector lamella 14. The ends of the conductor strips are slightly relieved or chamfered at superimposed surfaces with respect to each other as well as with respect to the collector lamella 14. The various conductors 19–22, as well as the collector lamella 14 are electrically and mechanically connected by a solder joint 23. The ends 19–22 of the armature windings seat on a shoulder formed on the collector.

The armature winding ends 19–22 are aligned to form a uniform end face (or are cut to form such a face), extending over the shoulder formed on the armature lamella. A solder strip 24 is edge-wise applied against the end faces of the armature conductors 19–22, and pressed thereagainst.

The extending ends of the armature conductors as well as the inner end of the associated collector lamella are heated by resistance heating. Two electrodes 15, 17 of a resistance welding machine are applied against the electrodes and the armature lamella, respectively. The electrode 15 is slightly bent over the axis of the shaft 10, so as to match the surface of the associated lamella 14. It extends closely adjacent the end faces of the armature conductors. The second electrode 17 has an end portion 18 which fits over and around the upper armature conductor 19, to press the armature conductors 19–22 against the shoulder of the collector lamella 14, while maintaining the conductors in stacked alignment. Electrode 15 is connected by cable 16 to an electrical connection. Cable 16 preferably includes two ducts to permit introduction and removal of a cooling fluid, typically a cooling liquid, as schematically indicated. Any suitable cooling arrangement for the electrode may be used. The second electrode 17 may also be cooled if over-heating of electrode 17 becomes a problem. Electrode 15, however, preferably should always be cooled, since this electrode must remove heat from the commutator so that damage to insulation between the commutator lamellae is avoided. A-C at a voltage of between 1 to 10 V is applied between the electrodes, with a current of several kilo-amperes flowing over the end of the collector and the ends of the armature conductors to be joined together. Roving 25 to mechanically secure the armature conductors and prevent dislocation upon centrifugal forces can be wound over the conductors before or after the process is carried out.

Solder is applied at the end faces under pressure, being pressed against the aligned ends of the armature conductors. All four solder connections will be formed simultaneously. Solder will flow between the armature conductors, that is, between their inner surfaces and the surface of the collector lamella. This solder flow will provide for reliable and secure mechanical and electrical connection. The quantity of solder can readily be controlled, for example by controlling the duration of pressing the solder strip 24 against the matching end faces of the armature conductors 19–22.

A group of armature conductor strips can thus be secured to the lamella of a commutator of a dynamo electric machine in economically efficient manner while resulting in a technically reliable and excellent connection. A separate manufacturing step is eliminated; the electrical contact connection is improved with respect to that of a spotwelding or other welding connection since large-wide area connecting surfaces are provided. An additional advantage is in the manufacturing technology since the armature can be completely assembled before connecting the armature conductors to the commutator; the commutator and the armature can thus be separately made. This is not possible if the armature conductors have to be first welded together among each other. Extending the armature conductors over an end face of the commutator results in a construction in which the extending armature conductors have the effect of fan blades to pick up air and guide it along the conductors, thus improving cooling of the machine.

In a simple way of carrying out the process, the armature conductors are first stacked vertically and then pressed together by the jig element 18 of the electrode 17 against each other as well as against the end shoulder of the commutator. By cooling the second electrode 15, the commutator lamellae are maintained at a reasonable temperature. Thus, the entire armature can be first constructed and assembled, with the commutator pressed on the shaft and likewise assembled thereto before the armature conductors are secured to the commutator, and without damaging the insulation material which holds the commutator segments separate and insulated from each other. These insulating elements frequently are plastic, insulating strips or lamellae which can be damaged by excessive heating. The present invention permits connecting the armature conductors and the commutator lamella in one step without endangering the insulation between the commutator lamella and without requiring an additional operating step. The melted solder, derived from solder strip 24, will flow by capillary action between the armature conductors, which can be additionally assisted by slightly tapering or chamfering the end surfaces. Heat transfer between adjacent armature conductors and the collector lamella is uniform and excellent.

Various changes and modifications may be made within the scope of the inventive concept.

I claim:

1. In the manufacture of dynamo electric machines, a method to secure a plurality of superimposed armature winding conductors (19-22) to a commutator lamella (14) of the commutator of the machine comprising the steps of superimposing the end portions of the conductors to form a stack of conductors;

locating the superimposed stack of conductors over a portion of the respective commutator lamella (14);

and, in a single operation, resistance-heating and soldering said superimposed conductors and said portion of the lamella to form a solid connection and to simultaneously secure together said conductors and said lamella, said heating and soldering step comprising the step of contacting the uppermost of the stack of conductors with a first electrode;

contacting the lamella with a second electrode and pressing said first electrode on said stack to press said stack against the lamella (14) while simultaneously supplying solder to the stack and lamella and passing current therethrough to effect resistance heating and soldering.

2. Method according to claim 1, further comprising the step of cooling the lamella up to a region thereof immediately adjacent the solder connection.

3. Method according to claim 3, wherein said cooling step comprises the step of cooling the electrode.

4. Method according to claim 2, further comprising the step of relieving the terminal end portions of the conductors at adjacent surfaces which are superimposed to form an entrance gap for molten solder to flow therebetween during said soldering step.

5. Method according to claim 2, wherein said locating step further comprises aligning the terminal ends of the conductors forming the stack to align their end faces in a common plane;

and the heating and soldering step comprises placing a ribbon of solder against the end faces and then applying power between said electrodes to cause the ribbon of solder to melt, molten solder being drawn between the conductors of said stack and between the lowermost conductor and the respective lamella to simultaneously secure the conductors and the lamella together.

6. Method according to claim 2, wherein said locating step further comprises aligning the terminal end faces of the conductors forming the stack to align their ends in a common plane;

and the heating and soldering step comprises placing a ribbon of solder against the end faces in said common plane, and then resistance soldering together said conductors and the end portion of the respective lamella.

7. Method according to claim 1, wherein the step of locating said stack of superimposed conductors comprises locating said conductor stack radially above the respective collector lamellae.

8. Method according to claim 7, wherein said locating step further comprises aligning the terminal end faces of the conductors forming the stack to align their ends in a common plane;

and the heating and soldering step comprises placing a ribbon of solder against the end faces in said common plane, and then resistance-soldering together said conductors and the end portion of the respective lamella.

9. Method according to claim 1, further comprising the step of relieving the terminal end portions of the conductors at adjacent surfaces which are superimposed to form an entrance gap for molten solder to flow therebetween during said soldering step.

10. Method according to claim 9, wherein said locating step further comprises aligning the terminal ends of the conductors forming the stack to align their end faces in a common plane;

and the heating and soldering step comprises placing a ribbon of solder against the end faces and then applying power between said electrodes to cause the ribbon of solder to melt, molten solder being drawn between the conductors of said stack and between the lowermost conductor and the respective lamella to simultaneously secure the conductors and the lamella together.

* * * * *